United States Patent [19]

Hardesty

[11] 4,213,628
[45] Jul. 22, 1980

[54] PULLING HITCH FOR AGRICULTURAL IMPLEMENTS

[75] Inventor: Robert D. Hardesty, Spangle, Wash.

[73] Assignees: Tom Pottratz; Ronald Pottratz, Jr.; Advanced Design and Construction, all of Latah, Wash.

[21] Appl. No.: 942,429

[22] Filed: Sep. 14, 1978

Related U.S. Application Data

[63] Continuation of Ser. No. 853,486, Nov. 21, 1977, abandoned.

[51] Int. Cl.² ............................................. B60D 1/18
[52] U.S. Cl. .............................. 280/412; 280/476 A
[58] Field of Search .......... 280/476 A, 411 R, 411 A, 280/411 B, 411 C, 412, 413, 468, 472, 462, 463, 456 R; 172/311, 314, 456, 581, 646, 649, 656, 667, 673

[56] References Cited

U.S. PATENT DOCUMENTS

| 2,136,550 | 11/1938 | Howard | 280/412 |
| 2,515,016 | 7/1950 | McClintock | 280/411 C |
| 3,738,682 | 6/1973 | Ritter | 280/412 |

Primary Examiner—John J. Love
Assistant Examiner—Randall A. Schrecengost
Attorney, Agent, or Firm—Wells, St. John & Roberts

[57] ABSTRACT

A pulling hitch for connecting a plurality of transverse agricultural implements to a single towing vehicle for both field and road usage. First and second rigid horizontal frames respectively tow a pair of independent transverse implements. The first frame is towed behind a tractor by means of a pivotable tongue. The second frame is pulled from the rear of the first frame. It is pivotable between a laterally extended position for field use, and a rearwardly extending position for road travel. Extensible braces or cylinders are utilized to locate the second frame relative to the first, and to locate the pulling tongue of the first frame relative to it.

12 Claims, 11 Drawing Figures

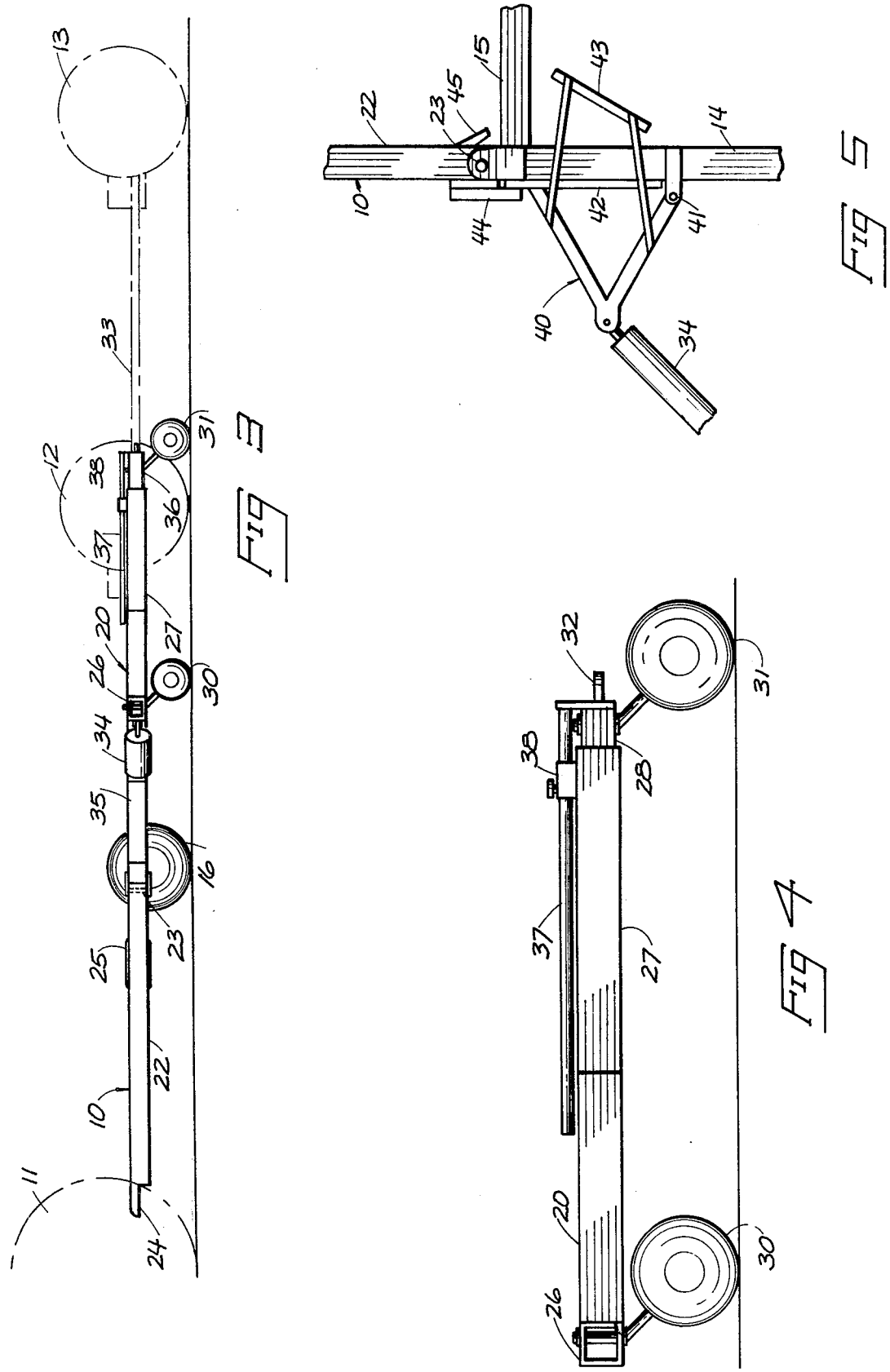

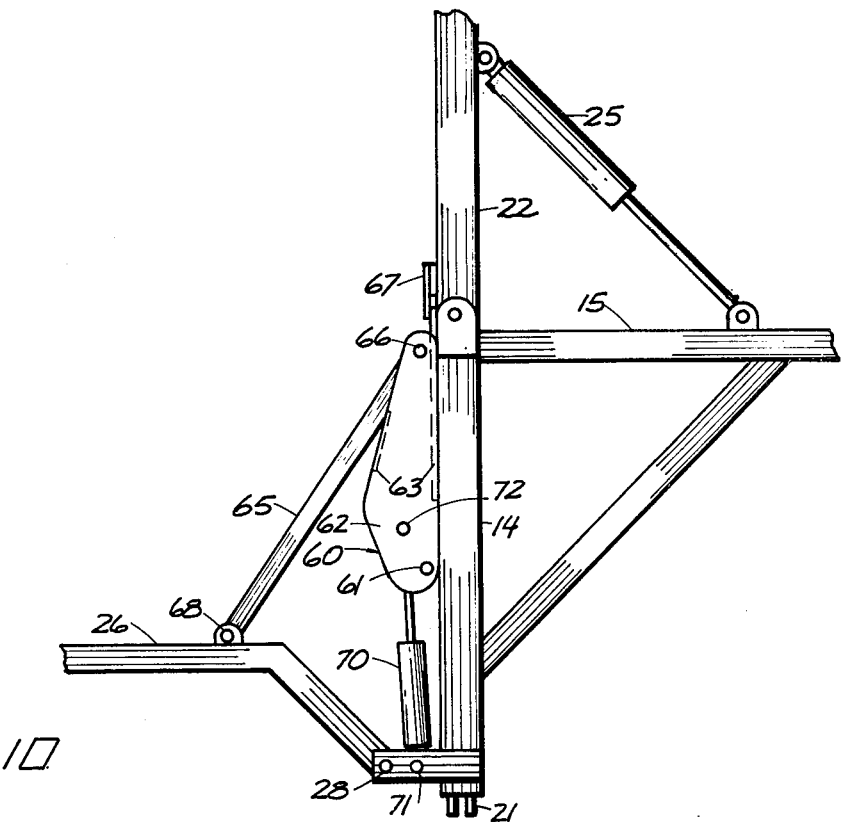
Fig 10
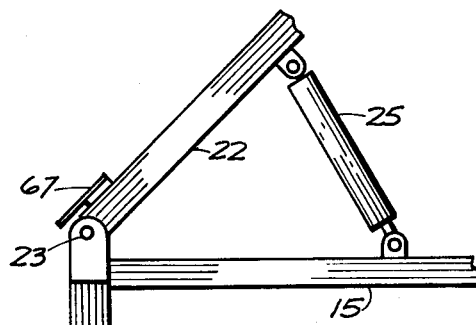
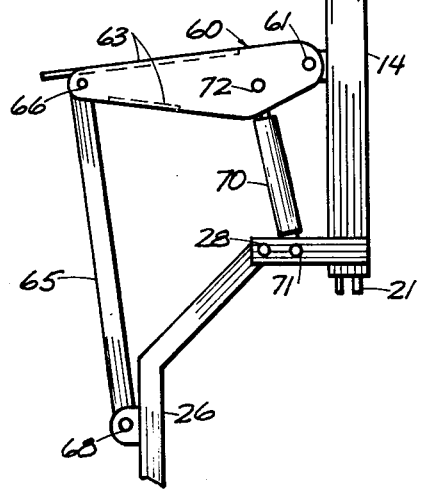
Fig 11

PULLING HITCH FOR AGRICULTURAL IMPLEMENTS

RELATED APPLICATIONS

This is a continuation of U.S. patent application Ser. No. 853,486, filed Nov. 21, 1977 and now abandoned.

BACKGROUND OF THE INVENTION

As farms have grown in size, both larger tractors and larger implements have been developed to match the production requirements of modern agricultural efforts. The development of agricultural tractors having substantial pulling power capable of pulling several implements simultaneously has necessitated the development of hitches to effectively couple the implements to the tractor. In the case of transversely located implements, such hitches must provide proper lateral positioning of the individual implements to completely cover a field over which the implements are drawn. In addition, the hitches must provide for folding capability to allow the implements to be pulled one behind the other for road travel. The present hitch was developed in an effort to meet the practical requirements of such applications.

DESCRIPTION OF THE DRAWINGS

FIG. 3 is an enlarged side elevation view as seen along line 3—3 in FIG. 1;

FIG. 4 is an enlarged fragmentary side elevation view taken along line 4—4 in FIG. 1;

FIG. 5 is an enlarged fragmentary plan view of a first modification of the hitch;

FIG. 10 is a fragmentary plan view of a fourth alternative structure; and

FIG. 11 is similar to FIG. 10, showing an alternate angular position of the illustrated elements.

DESCRIPTION OF THE PREFERRED EMBODIMENTS

Figure 6:
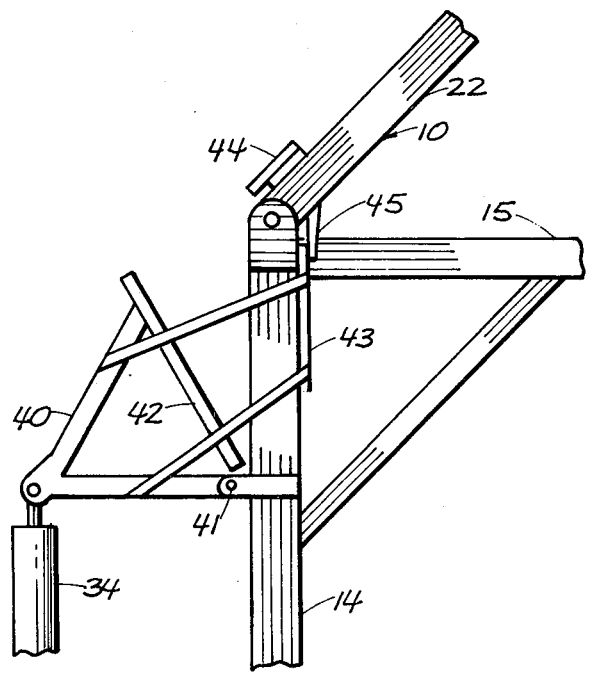
FIG. 6 is similar to FIG. 5, showing alternate angular positions of the illustrated elements.
Figure 7:
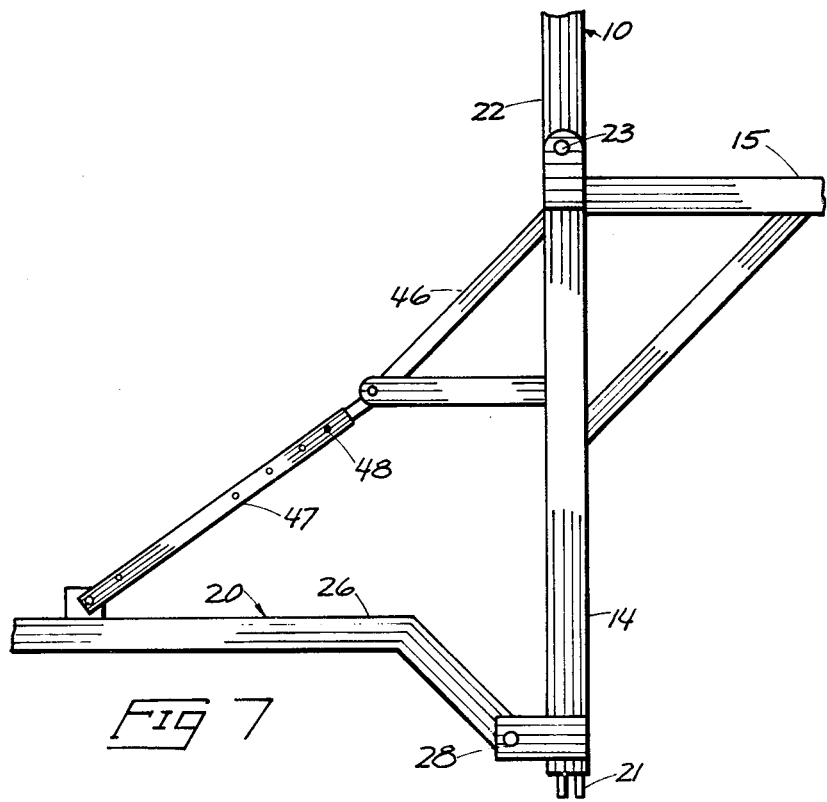
FIG. 7 is a fragmentary plan view of a second alternative structure.
Figure 8:
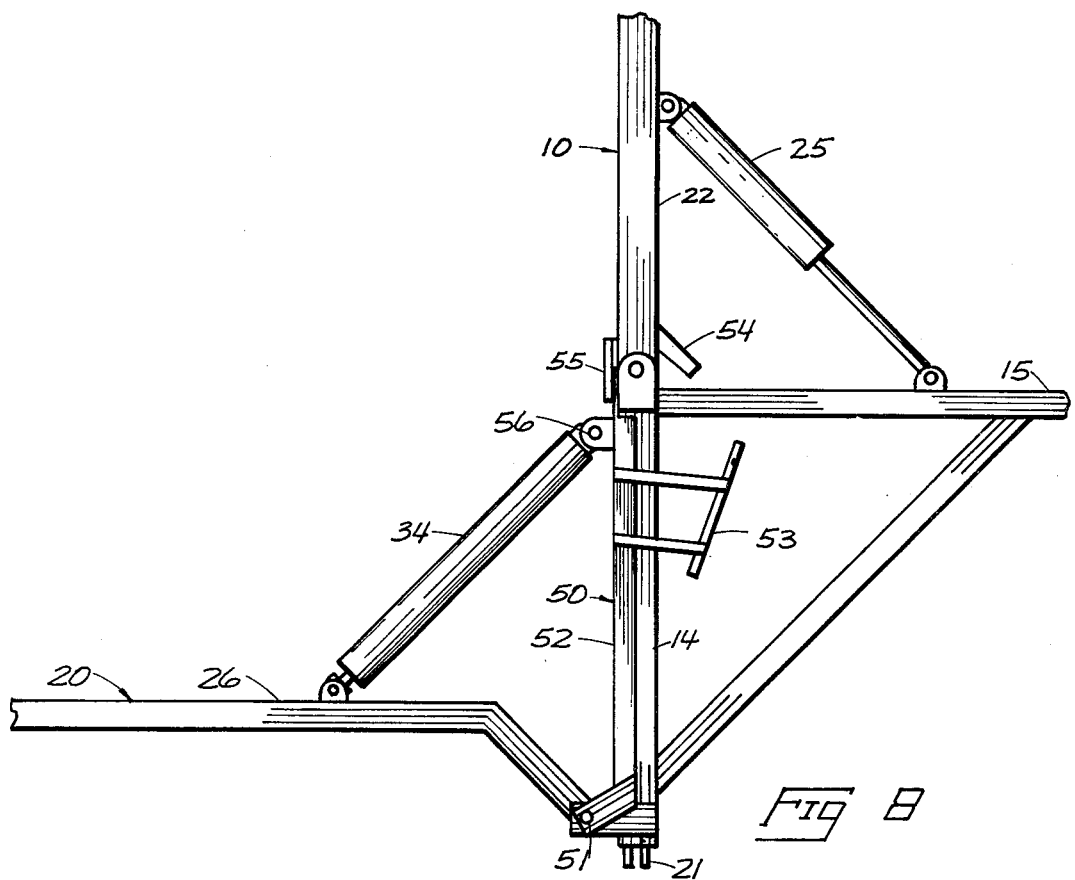
FIG. 8 is a fragmentary plan view of a third alternative structure.
Figure 9:
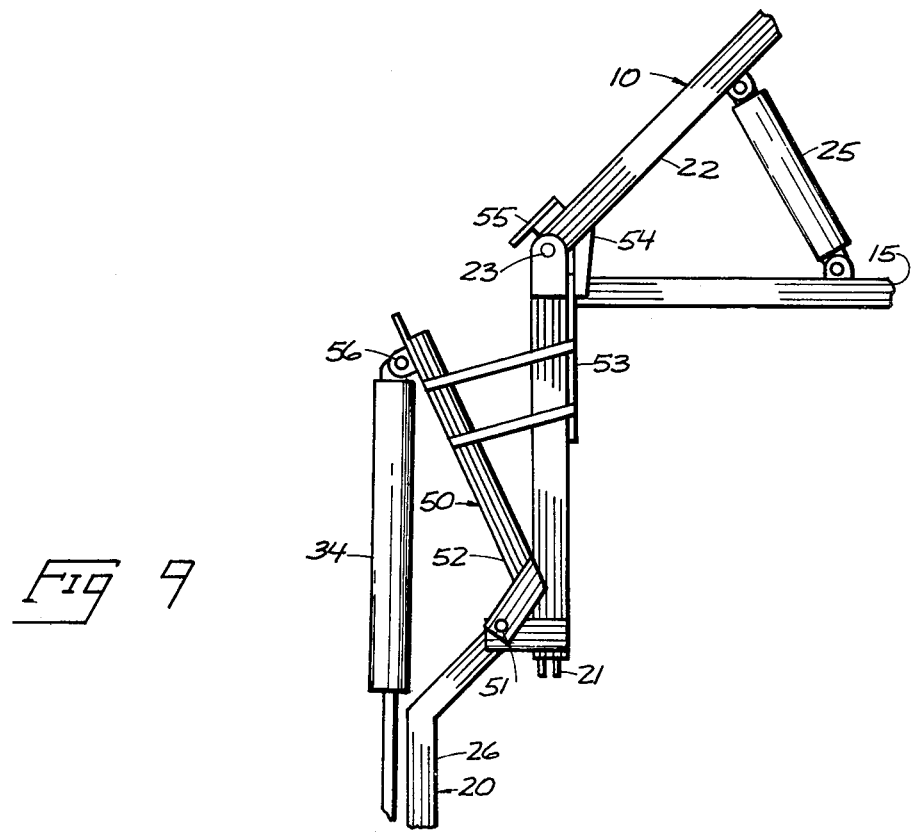
FIG. 9 is similar to FIG. 8, showing an alternate angular position of the illustrated elements.

The basic apparatus disclosed herein is shown in detail in FIGS. 1 through 4, which illustrate a first embodiment. FIGS. 5 and 6 show alternate elements coupling the two hitch frames. FIG. 7 shows a second alternate structure. A third alternate structure is shown in FIGS. 8 and 9, and a fourth is shown in FIGS. 10 and 11.

Referring to FIGS. 1 through 4, the hitch comprises a first rigid frame designated by the numeral 10, and a second rigid frame designated by the numeral 20. For purposes of illustration, the rear portion of a conventional farm tractor is shown in dashed lines at 11. A first transverse agricultural implement is shown in dashed lines at 12. A second similar implement is shown in dashed lines at 13. These particular implements 12, 13 can be of many different types, seed drills used for planting grain or other crops being a typical example. Such implements are normally mounted on frames that are supported by wheels at the ends of the implement. The frames normally have mechanisms for raising or lowering the mechanism of the implement to provide for road travel or field usage. The details of the implements and their supporting frames and wheel assemblies are not necessary to an understanding of the present hitch.

Figure 2:
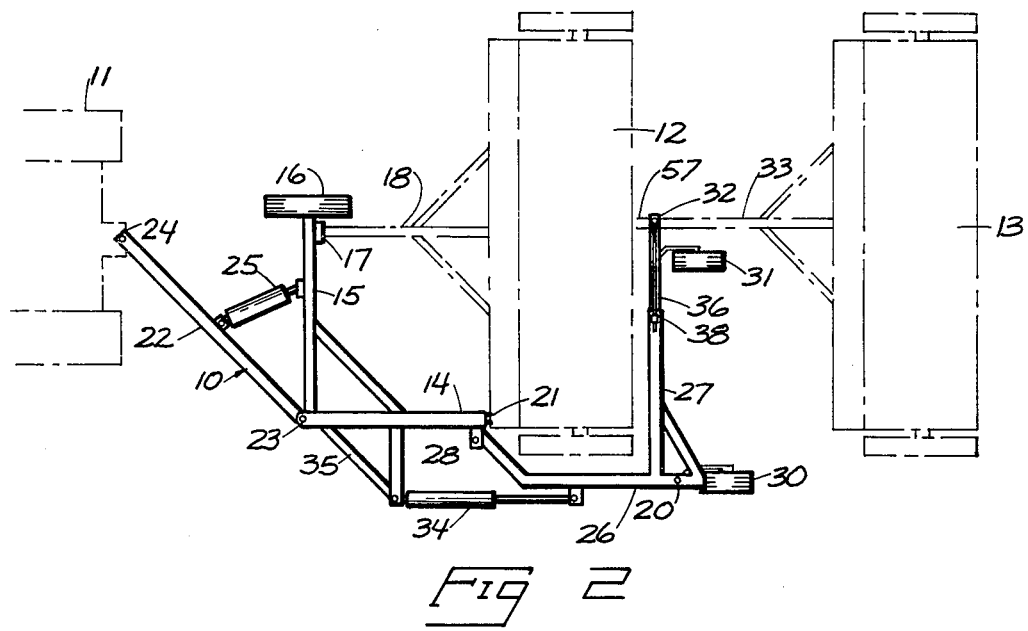
FIG. 2 is a plan view of the hitch in condition for road travel.

The general purpose of the hitch is to effectively permit the two implements 12 and 13 to be towed behind the tractor 11 in proper transverse positions (FIG. 1) for field use, or to alternately permit the implements 12, 13 to be towed one behind the other in aligment with the tractor 11 for road travel (FIG. 2).

The first horizontal rigid frame 10 comprises a longitudinal member 14 having spaced front and rear ends. A transverse member 15 extends to one side of the longitudinal member 14. The transverse member 15 has spaced inner and outer ends with respect to its position relative to the member 14. The inner end of transverse member 15 is fixed to the front end of the longitudinal member 14. An angular brace connects the two members 14, 15 to assist in maintaining their perpendicular relationship with respect to one another.

The outer end of transverse member 15 supports a ground engaging wheel 16 of conventional structure. The wheel 16 is rotatably mounted on the first frame 10 about a transverse axis. The outer end of transverse member 15 is also provided with a first hitch 17 for selective attachment to the pulling tongue 18 of the implement illustrated generally at 12. Implement 12 is further connected to the first frame 10 by means of an attachment bracket 21 at the rear end of longitudinal member 14. The hitch 17 and bracket 21 each accommodate relative elevational movement between the implement 12 and first frame 10, but restrict any lateral or transverse movement, thereby controlling the longitudinal path of implement 12 relative to the towing tractor 11.

The front end of longitudinal member 14 has a pivotal connection to a forwardly extending tongue 22. This connection is shown as a pivot pin 23 which defines a first upright pivot axis on the frame 10. The forward end of tongue 22 is provided with a conventional towing hitch for attachment to the rear of tractor 11, illustrated generally by a hitch pin 24.

A conventional hydraulic cylinder assembly 25 is pivotally connected between the intermediate portion of tongue 22 and the intermediate portion of the transverse member 15. Cylinder assembly 25 is capable of shifting the tongue 22 about the axis defined by pivot pin 23 between a first angular position parallel to the longitudinal member 14 (FIG. 1) and a second angular position in which the front end of the tongue 22 is spaced forward from the first hitch 17 and in longitudinal alignment therewith (FIG. 2).

The second rigid frame 20 includes first and second members 26 and 27 joined at right angles to one another. The first member 26 has an outer end pivotally connected to the rear end of the longitudinal member 14 of frame 10 about a pivot pin 28. Pivot pin 28 defines a second upright pivot axis parallel to the first axis defined by pivot pin 23. The second member 27 of frame 20 has an outer end spaced from its rigid perpendicular connection or joinder to the first member 26.

The second rigid frame 20 is supported above the ground surface by a pair of caster wheel assemblies. An outboard wheel is shown at 30 and an end wheel is shown at 31. The outer end of the second member 27 has a second hitch 32 mounted to it for attachment to the pulling tongue 33 of implement 13.

Means is provided between the first and second frames for alternately locating the second frame about the axis presented by pivot pin 28 between a first angular position (FIG. 1) in which the second member 27 is parallel to the longitudinal member 14 and a second angular position (FIG. 2) in which the rear end of the second member 27 is spaced rearward from the first hitch 17 and in longitudinal alignment therewith. In FIGS. 1 through 4 this means is presented in the form of a conventional hydraulic cylinder assembly 34 pivotally connected between an intermediate portion of the first member 26 and a rigid bracket 35. The bracket 35 is fixed to the longitudinal member 14 and extends to the side thereof opposite to the transverse member 15.

Figure 1:
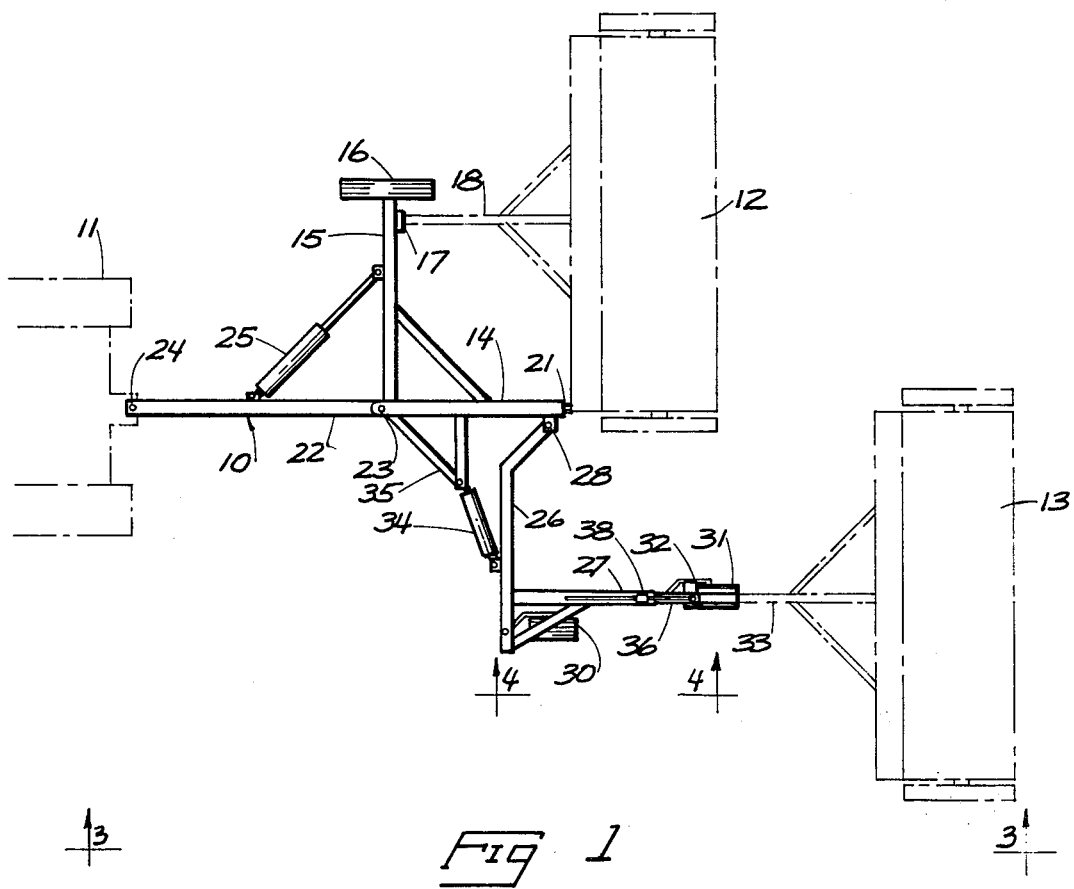
FIG. 1 is a plan view of a first embodiment of the hitch.

To provide for close coupled pulling of the implements 12, 13 during field use, the second member 27 in the frame 20 may be extensible. The details of a typical extensible structure are best seen in FIGS. 3 and 4. The rear end of the member 27 telescopically receives an inner member 36 which can be pulled outward from the member 27 or retracted within it as desired. Immediately above these members is a parallel rod 37 fixed to the rear end of the member 36. The rod 37 slides within a releasable clamp 38, which can be manually set to vary the length of the second member 27 as desired. In the embodiment shown, the member 36 would be retracted while parallel to the longitudinal member 14 as shown in FIGS. 1, 3 and 4. It would be extended outward as shown in FIG. 2 when in a transverse position, so as to properly locate the second hitch 32 in longitudinal alignment behind the first hitch 17 and the towing hitch of the tractor 11.

To assist in pulling the two implements 12, 13 along a road, and to reduce the strain on the articulated frames 10, 20 a simple clevis hitch is provided at the back of the first implement 12. This hitch is shown generally at 57. It mates with a complementary bracket at the extensible outer end of the telescoping member 36 on the second member 27 of frame 20. The hitch 57 is released when the frame 20 is to be swung to the field position shown in FIG. 1.

A first modification of the connecting structure between the two frames 10, 20 is shown in FIG. 5. In place of the rigid bracket 35, a movable bracket is provided on the longitudinal member 14. This bracket 40 is connected to the longitudinal member 14 by a pivot pin 41 which defines a third upright pivot axis parallel to the two previously discussed. The bracket 40 straddles the longitudinal member 14, having a first element 42 at the side of longitudinal member 14 opposite to the transverse member 15, and a second element 43 at the remaining side of the member 14. Bracket 40 is pivotable about pin 41 between a first position in which the element 42 engages the longitudinal member 14 (FIG. 5) and a second position in which the element 43 engages longitudinal member 14 (FIG. 6).

Bracket 40 may be locked in one or the other of these angular positions by control of the angular position of tongue 22. The rear end of tongue 22 is provided with a pair of fixed latch members 44, 45. Latch member 44 is adapted to overlap the forward end of element 42 when the tongue 22 is in its longitudinal position for field travel. Latch member 45 is adapted to overlap the second element 43 of bracket 40 when the tongue 22 is angularly located for road travel as shown in FIG. 2. The purpose of the pivotable bracket 40 is to vary the longitudinal position of the outer connection between the bracket 40 and the previously described hydraulic assembly 34 to provide clearance for cylinder operation. This assures 90 degree movement of frame 20 with respect to frame 10 about the pivot pin 28.

When desired, frame 20 can be angularly located with respect to frame 10 by mechanical devices not requiring hydraulic power. FIG. 7 illustrates a rigid extensible brace 47 connected between a bracket 46 fixed to the longitudinal member 14 and an intermediate portion of the first member 26 on frame 20. An adjustable pin 48 selectively locks the telescoping members forming extensible brace 47 at the necessary length to locate frame 20 in either of its two angular positions as discussed above. With this connection between the two frames, pin 48 may be released and the two frames may then be pivoted with respect to one another by properly steering and operating tractor 11 to turn the implements 12, 13 with respect to one another. Similarly, the first hydraulic cylinder assembly 25 that controls tongue 22 can be replaced by an extensible brace (not shown) if this is desired.

A modified form of the pivoted bracket on longitudinal member 14 is shown in FIGS. 8 and 9. This bracket, illustrated generally at 50, also straddles the longitudinal member 14. It is pivotally connected to longitudinal member 14 by a rear pivot pin 51 defining a third upright axis located as far to the back of the first frame 10 as possible. It also includes a first element 52 to the side of longitudinal member 14 opposite to the transverse member 15, and a second element 53 at the remaining side of member 14. Again, latch member 54, 55 selectively lock the front ends of the elements 52, 53. Latch member 54 is operative when the tongue 22 is in its road position (FIG. 9). The element 52 is connected to the outer end of hydraulic assembly 34 by a pivot connection 56 located adjacent the front end of element 52. Bracket 50 shifts the pivot connection 56 laterally to assure 90 degree pivotal movement beetween frames 10 and 20 by use of a single hydraulic cylinder providing straight line movement only.

Another alternative connection between the two frames 10, 20 is shown in FIGS. 10 and 11. This structure includes a rigid bell crank 60 in the structural form of a pair of vertically spaced horizontal plates 62 connected by interior vertical ribs shown at 63. The rear end of bell crank 60 is pivotally connected to a rigid brace 65, the connection being shown by means of a pin 66. The remaining end of brace 65 is connected at 68 to the intermediate portion of the first member 26 of the frame 20. Bell crank 60 is selectively located about the axis of pivot pin 61 by a relatively small hydraulic cylinder assembly 70 connected between a bracket 71 at the rear end of longitudinal member 14 and a pivot pin on bell crank 60 shown at 72.

One of the vertical ribs within the bell crank 60 protrudes from its forward end and is selectively overlapped by a latch member 67 fixed to the rear end of tongue 22 when the tongue 22 is in its longitudinal or field position. When the tongue 22 is in its angular position for road travel, latch member 67 frees bell crank 60 for angular movement as imparted to it by operation of hydraulic cylinder assembly 70. The relative positions of these elements for road travel is shown in FIG. 11.

This last embodiment of the invention can also be used with or without hydraulic cylinders. The hydraulic cylinder assembly 70, as well as the hydraulic cylinder assembly 25 can be replaced by extensible mechanical braces and all angular movement of the frames 10, 20 and tongue 22 can be controlled by properly steering and pulling the hitch components by operation of tractor 11.

The controlled articulated connection provided between frames 10 and 20 is further useful to assure proper usage of the implements 12, 13 along a side hill area. The rigid brace connected between the frames 10, 20 or the hydraulic cylinder assembly connected between them can be adjusted at intermediate angular positions to minimize skipping of areas between the paths of the two implements 12, 20 or to prevent undesirable overlap.

While the connections between the various elements on frames 10, 20 and tongue 22 have been described as simple pins, in actual practice these connections would probably be ball joints or flexible univeral joints allowing the coupled elements to pivot vertically as well as horizontally. This is particularly important when the hitch is used on non-level terrain, since the substantial extension along the hitch components must then accommodate itself to hill surfaces without exerting unnecessary strain on them or the implements 12, 13.

Various detailed modifications might be made with respect to the structures illustrated without deviating from the essential relationship which comprises this invention. For this reason, the following claims are set out as definitions of the invention disclosed herein.

Having described my invention, I claim:

1. A pulling hitch for connecting a plurality of transverse agricultural implements to a single towing vehicle, comprising:

a first rigid horizontal frame comprising a longitudinal member having spaced front and rear ends, and a transverse member fixed to the front end of said longitudinal member and extending to one side thereof;

first hitch means mounted to the transverse member for attachment to the pulling tongue of a first transverse agricultural implement located behind the first frame;

bracket means mounted at the rear end of said longitudinal member for direct attachment to an adjacent side of said first implement;

a tongue mounted to the first rigid horizontal frame and extending forwardly therefrom, said tongue having a front end with means thereon for towing attachment to a powered vehicle;

a second rigid horizontal frame comprising first and second members joined at substantially right angles to one another, said first member having an outer end pivotally connected to the rear end of the longitudinal member of said first frame about an upright axis;

second hitch means mounted to the second member for attachment to the pulling tongue of a second transverse agricultural implement located behind the second frame;

and means operably connected between said first and second frames for alternately locating the second frame about said second upright axis relative to said first frame between a first angular position in which the second member is laterally offset and substantially parallel to the longitudinal member of said first frame, and a second angular position in which said second hitch means is spaced rearward from said first hitch means and in longitudinal alignment therewith.

2. A pulling hitch as set out in claim 1, further comprising: ground engaging wheel means mounted to said first frame.

3. A pulling hitch as set out in claim 1 wherein said last-named means comprises:

a hydraulic cylinder assembly arranged in a horizontal position to the side of said longitudinal member opposite said transverse member of said first frame;

one end of said hydraulic cylinder assembly being operably connected to said longitudinal member;

the remaining end of said hydraulic cylinder being operably connected to said first member of said second frame.

4. A pulling hitch for connecting a plurality of transverse agricultural implements to a single towing vehicle, comprising:

a first rigid horizontal frame comprising a longitudinal member having spaced front and rear ends, and a transverse member extending to one side thereof and having spaced inner and outer ends, the inner end of said transverse member being fixed to the front end of said longitudinal member;

ground engaging wheel means mounted to said first frame;

first hitch means mounted to the outer end of the transverse member for attachment to the pulling tongue of a first transverse agricultural implement located behind the first frame;

bracket means mounted at the rear end of said longitudinal member for direct attachment to the adjacent side of said first implement;

a tongue mounted about a first upright pivot axis at the front end of said longitudinal member and extending forwardly therefrom, said tongue having a front end with means hereon for towing attachment to a powered vehicle;

means operably connected between said first frame and said tongue for alternately locating the tongue about said first upright axis relative to said first frame between a first angular position parallel to said longitudinal member, and a second angular position in which the front end of the tongue is spaced forward from said first hitch means and in longitudinal alignment therewith;

a second rigid horizontal frame comprising first and second members joined at right angles to one another, said first member having an outer end pivotally connected to the rear end of the longitudinal member of said first frame about a second upright axis parallel to said first upright axis, said second member having an outer end spaced from its joinder to said first member;

ground-engaging wheel means mounted to said second frame;

second hitch means mounted to the outer end of the second member for attachment to the pulling tongue of a second transverse agricultural implement located behind the second frame;

and means operably connected between said first and second frames for alternately locating the second frame about said second upright axis relative to said first frame between a first angular position in which the second member is laterally offset and substantially parallel to the longitudinal member of said first frame, and a second angular position in which the rear end of said second member is spaced rearward from said first hitch means and in longitudinal alignment therewith.

5. A pulling hitch as set out in claim 4 wherein said second member of said second frame is selectively extensible in length.

6. A pulling hitch as set out in claim 4 wherein said last-named means comprises:

a hydraulic cylinder assembly arranged in a horizontal position to the side of said longitudinal member opposite said transverse member of said first frame;

one end of said hydraulic cylinder assembly being operably connected to said longitudinal member;

the remaining end of said hydraulic cylinder being operably connected to said first member of said second frame.

7. A pulling hitch as set out in claim 6 further comprising:

a bracket pivotally mounted to said longitudinal member about a third upright pivot axis and extending to the side of said longitudinal member opposite said transverse member of said first frame;

said one end of the hydraulic cylinder being connected to said bracket;

and releasable means for angularly locating said bracket about said third upright pivot axis to thereby vary the longitudinal position of said one end of the hydraulic cylinder relative to said first frame.

8. A pulling hitch as set out in claim 7 wherein said releasable means is mounted to said tongue.

9. A pulling hitch as set out in claim 4 wherein said last-named means comprises:

an extensible rigid brace having one end pivotally mounted to a bracket mounted to said longitudinal member and extending to the side of said longitudinal member opposite said transverse member of said first frame, the remaining end of said brace being pivotally connected to said first member of said second frame.

10. A pulling hitch as set out in claim 4 wherein said last-named means comprises:

a bracket pivotally mounted to said longitudinal member about a third upright pivot axis rearward of said first upright pivot axis, said bracket straddling the longitudinal member and having first and second elements at the respective sides of said longitudinal member;

and latching means at opposite sides of said tongue for overlapping the respective outer ends of the first and second elements, dependent upon the angular position of said tongue with respect to said first frame to thereby retain said bracket at one of two angular positions relative to said first frame;

and extensible means operably connected between the bracket and said first member of the second frame.

11. A pulling hitch as set out in claim 4 wherein said last-named means comprises:

a bell crank pivotally connected to said longitudinal member of the first frame about a third upright pivot axis rearward from said first upright pivot axis, said bell crank being located to the side of said longitudinal member opposite said transverse member of said first frame;

a rigid brace pivotally connected between said bell crank and said second frame;

and extensible means operatively connected between said first frame and said bell crank for locating said bell crank relative to said first frame about said third upright pivot axis.

12. A pulling hitch as set out in claim 11, further comprising:

latch means on said tongue for selectively fixing the position of said bell crank with respect to said first frame.

* * * * *

UNITED STATES PATENT AND TRADEMARK OFFICE
CERTIFICATE OF CORRECTION

PATENT NO. : 4,213,628
DATED : July 12, 1980
INVENTOR(S) : Robert D. Hardesty

It is certified that error appears in the above-identified patent and that said Letters Patent are hereby corrected as shown below:

The designation of "assignees" on the cover page of the patent should be deleted.

Signed and Sealed this

Second Day of February 1982

[SEAL]

Attest:

Attesting Officer

GERALD J. MOSSINGHOFF
Commissioner of Patents and Trademarks